(12) United States Patent
Zargari et al.

(10) Patent No.: US 8,908,575 B2
(45) Date of Patent: Dec. 9, 2014

(54) METHODS AND SYSTEMS FOR CALIBRATING A FREQUENCY-DIVISION DUPLEXING TRANSCEIVER

(71) Applicant: QUALCOMM Incorporated, San Diego, CA (US)

(72) Inventors: Masoud Zargari, Irvine, CA (US); Shahram Abdollahi-Alibeik, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 13/747,339

(22) Filed: Jan. 22, 2013

(65) Prior Publication Data

US 2013/0272175 A1 Oct. 17, 2013

Related U.S. Application Data

(60) Provisional application No. 61/624,978, filed on Apr. 16, 2012.

(51) Int. Cl.
*H04L 5/14* (2006.01)
*H04B 1/50* (2006.01)
*H04B 17/00* (2006.01)

(52) U.S. Cl.
CPC .. *H04L 5/14* (2013.01); *H04B 1/50* (2013.01); *H04B 17/0015* (2013.01); *H04B 17/0062* (2013.01); *H04B 17/0012* (2013.01)
USPC ........................................... 370/281; 370/295

(58) Field of Classification Search
None
See application file for complete search history.

(56) References Cited

U.S. PATENT DOCUMENTS

| | | | |
|---|---|---|---|
| 6,690,952 B2 | 2/2004 | Nishimori et al. | |
| 6,829,469 B1 * | 12/2004 | Henriksson | 455/76 |
| 7,181,205 B1 * | 2/2007 | Scott et al. | 455/423 |
| 7,463,866 B1 * | 12/2008 | Chen | 455/91 |
| 7,567,611 B2 | 7/2009 | Chien | |
| 8,126,452 B2 | 2/2012 | Ries et al. | |
| 8,135,055 B2 | 3/2012 | Kohlmann | |
| 8,295,845 B1 * | 10/2012 | Abdollahi-Alibeik et al. | 455/445 |
| 2005/0069056 A1 * | 3/2005 | Willingham | 375/327 |
| 2007/0099570 A1 * | 5/2007 | Gao et al. | 455/63.1 |
| 2007/0293163 A1 * | 12/2007 | Kilpatrick et al. | 455/84 |
| 2008/0171524 A1 * | 7/2008 | Heng | 455/150.1 |
| 2010/0112962 A1 | 5/2010 | Van Zeijl et al. | |
| 2011/0128992 A1 | 6/2011 | Maeda et al. | |

OTHER PUBLICATIONS

International Search Report and Written Opinion—PCT/US2013/022793—ISA/EPO—May 10, 2013.

* cited by examiner

*Primary Examiner* — Anh-Vu Ly
*Assistant Examiner* — Hashim Bhatti
(74) *Attorney, Agent, or Firm* — Mahamedi Paradice LLP (57) ABSTRACT

A frequency-division duplexing (FDD) transceiver includes a first mixer to up-convert a transmit signal and a first switch, coupled to the first mixer, to selectively provide a transmit local oscillator signal or a receive local oscillator signal to the first mixer. The transmit local oscillator signal has a first frequency and the receive local oscillator signal has a second frequency distinct from the first frequency. The FDD transceiver also includes a second mixer to down-convert a receive signal and a second switch, coupled to the second mixer, to selectively provide the transmit local oscillator signal or the receive local oscillator signal to the second mixer.

23 Claims, 8 Drawing Sheets

METHODS AND SYSTEMS FOR CALIBRATING A FREQUENCY-DIVISION DUPLEXING TRANSCEIVER

RELATED APPLICATION

This application claims priority to U.S. Provisional Patent Application No. 61/624,978, titled "Methods and Systems for Calibrating a Frequency-Division Duplexing Transceiver," filed Apr. 16, 2012, which is hereby incorporated by reference in its entirety.

TECHNICAL FIELD

The present embodiments relate generally to communication systems, and specifically to compensating for signal impairments including I/Q mismatch in transceivers performing frequency-division duplexing (FDD).

BACKGROUND OF RELATED ART

Frequency-division duplexing (FDD) transceivers use distinct frequencies to transmit and receive data. Calibrating FDD transceivers is challenging: because the transmitter and receiver units in the transceiver use different frequencies, transmit data cannot simply be looped back to the receiver.

FDD transceivers may be implemented using Quadrature Amplitude Modulation (QAM) transceivers that are sensitive to various signal impairments that affect the quality of the transmitted and received signals. Signal impairments may result from non-idealities in the RF front-ends of the transceivers. For example, mismatched active and passive elements (e.g., quadrature mixers, filters, and/or analog-to-digital converters) in the I and Q (in-phase and quadrature) signal paths introduce I/Q mismatch impairments in transmitted and received signals. I/Q mismatch is present in both the transmitter and receiver.

Accordingly, there is a need for techniques to calibrate FDD transceivers to compensate for signal impairments such as I/Q mismatch.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

In accordance with the present embodiments, techniques are disclosed for calibrating a frequency-division duplexing (FDD) transceiver to compensate for signal impairments.

In some embodiments, an FDD transceiver includes a first mixer to up-convert a transmit signal and a first switch, coupled to the first mixer, to selectively provide a transmit local oscillator signal or a receive local oscillator signal to the first mixer. The transmit local oscillator signal has a first frequency and the receive local oscillator signal has a second frequency distinct from the first frequency. The FDD transceiver also includes a second mixer to down-convert a receive signal and a second switch, coupled to the second mixer, to selectively provide the transmit local oscillator signal or the receive local oscillator signal to the second mixer.

In some embodiments, a method of operating an FDD transceiver includes operating the FDD transceiver in a normal mode and a calibration mode. In the normal mode, a transmit local oscillator signal is provided to a first mixer to up-convert a transmit signal. A receive local oscillator signal is provided to a second mixer to down-convert a receive signal. The transmit local oscillator signal has a first frequency and the receive local oscillator signal has a second frequency distinct from the first frequency. In the calibration mode, either the transmit local oscillator signal or the receive local oscillator signal is provided to the first and second mixers.

In some embodiments, a non-transitory computer-readable storage medium stores instructions, which when executed by a processor in a communication device that includes a transceiver, cause the transceiver to provide a transmit local oscillator signal to a first mixer to up-convert a transmit signal in a normal mode; to provide a receive local oscillator signal to a second mixer to down-convert a receive signal in the normal mode, wherein the transmit local oscillator signal has a first frequency and the receive local oscillator signal has a second frequency distinct from the first frequency; and to provide either the transmit local oscillator signal or the receive local oscillator signal to the first and second mixers in a calibration mode.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
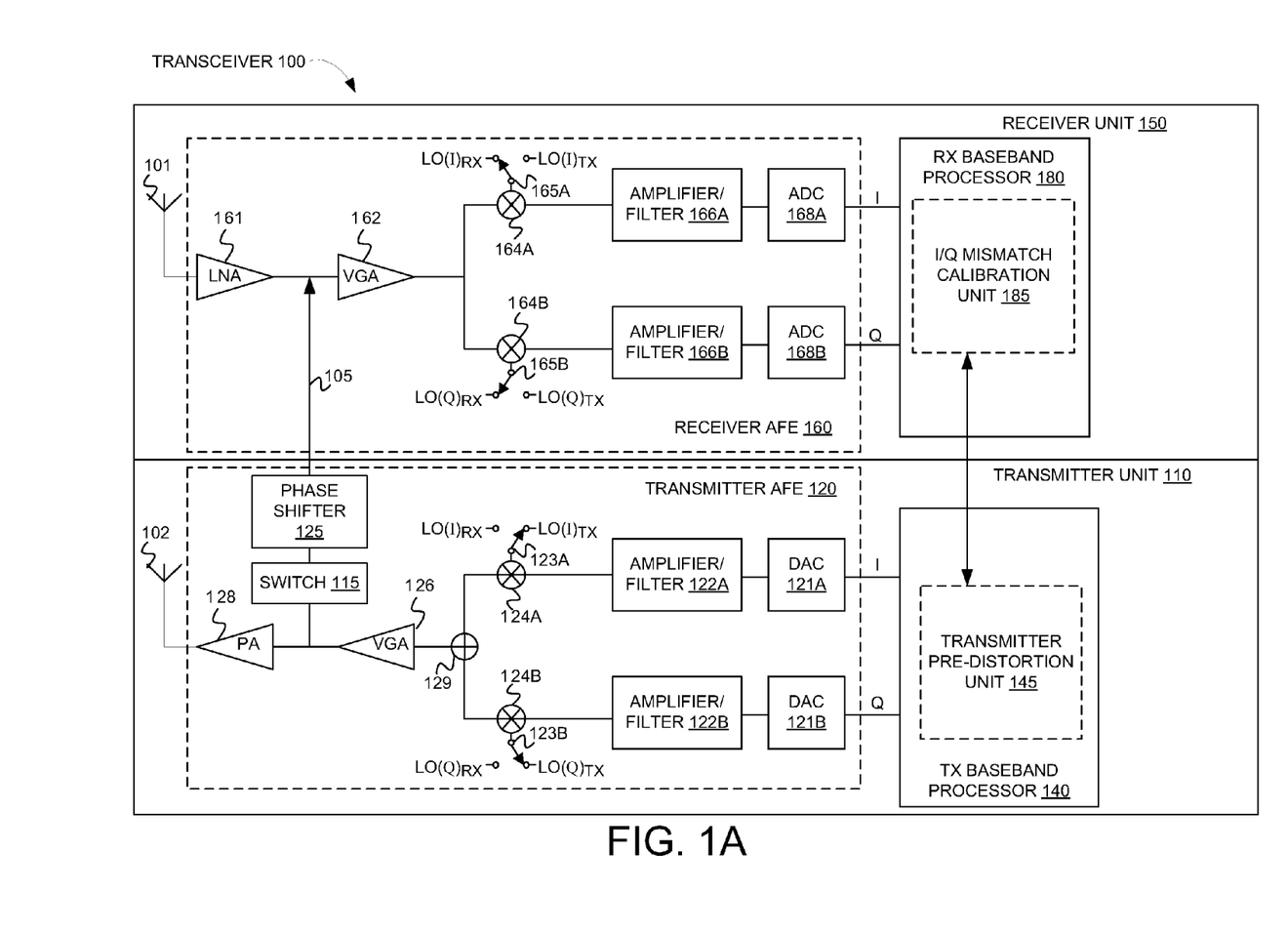
FIGS. 1A-1C are block diagrams of an FDD QAM transceiver in accordance with some embodiments.

FIG. 1A is a block diagram of a frequency-division duplexing (FDD) QAM transceiver 100 in accordance with some embodiments. The transceiver 100 may be included within a communication device (e.g., communication device 600, FIG. 6), such as a wireless (e.g., WLAN) device with a wireless network connection or a wireline device with a wired network connection. As illustrated, the transceiver 100 includes a transmitter unit 110 and a receiver unit 150. A loop-back path 105 is coupled between the transmitter unit 110 and the receiver unit 150 in the analog front end (AFE) of the transceiver 100. The loop-back path 105 is located in a radio-frequency (RF) portion of the AFE. The loop-back path 105 is used during calibration modes of the transceiver 100 to perform I/Q mismatch calibration operations. The calibration modes include a transmitter calibration mode for calibrating the transmitter unit 110 and a receiver calibration mode for calibrating the receiver unit 150.

In some embodiments, the transmitter unit 110 includes a transmitter AFE 120 and a transmitter baseband processor 140. For wireless devices, the transmitter unit 110 also includes an antenna 102. The transmitter baseband processor 140 includes a transmitter pre-distortion unit 145. The receiver unit 150 includes a receiver AFE 160 and a receiver baseband processor 180. The receiver baseband processor 180 includes an I/Q mismatch calibration unit 185. For wireless devices, the receiver unit 150 also includes an antenna 101. Alternately, the transmitter unit 110 and receiver unit 150 share a single, common antenna. For wireline devices, the antennas 101 and 102 are absent and the amplifiers 128 and 161 are coupled to wireline connections (e.g., to a single common wireline connection, such as a coaxial cable).

In the example of FIG. 1A, the transmitter AFE 120 includes a digital-to-analog converter (DAC) 121A for the in-phase (I) signal path, amplifier/filter circuitry 122A for the I signal path, a local oscillator (LO) mixer 124A for the I signal path, a DAC 121B for the quadrature (Q) signal path, amplifier/filter circuitry 122B for the Q signal path, an LO mixer 124B for the Q signal path, a variable gain amplifier (VGA) 126, and a power amplifier (PA) 128. The mixers 124A and 124B up-convert the I and Q transmit signals from baseband directly to the carrier frequency by mixing the I and Q transmit signals with local oscillator signals, where the frequency of the local oscillator signals is the carrier frequency. A combiner 129 combines the outputs of the mixers 124A and 124B and provides the combined outputs to VGA 126. Mismatch between mixers 124A and 124B, between amplifiers/filters 122A and 122B, and/or between DACs 121A and 121B results in transmitter-side I/Q mismatch.

The receiver AFE 160 includes a low-noise amplifier (LNA) 161, a VGA 162, an LO mixer 164A for the I signal path, amplifier/filter circuitry 166A for the I signal path, an analog-to-digital converter (ADC) 168A for the I signal path, an LO mixer 164B for the Q signal path, amplifier/filter circuitry 166B for the Q signal path, and an ADC 168B for the Q signal path. The mixers 164A and 164B directly down-convert the receive signal into baseband I and Q signals by mixing the receive signal with local oscillator signals, where the frequency of the local oscillator signals (as generated by a local oscillator, not shown) is ideally the carrier frequency. Mismatch between mixers 164A and 164B, between amplifiers/filters 166A and 166B, and/or between ADCs 168A and 168B results in receiver-side I/Q mismatch.

In the example of FIG. 1A, the transceiver 100 is implemented as a direct-conversion transceiver that converts receive signals from the frequency at which they are received directly to baseband and converts signals to be transmitted directly from baseband to the transmission frequency. Other implementations are possible, however. For example, the receiver unit 150 and/or transmitter unit 110 may include additional mixers to implement an intermediate-frequency (IF) architecture. In some implementations, the receiver unit 110 may include an additional mixer after the VGA 162 to implement a sliding IF architecture. The additional mixer or mixers may be coupled to switches that are analogous to switches 123A-B and 165A-B.

During normal FDD operation, the receiver AFE 160 and the transmitter AFE 120 operate at distinct frequencies. In the receiver AFE 160, switches 165A and 165B are respectively coupled to mixers 164A and 164B and are configured in the normal operating mode to provide in-phase and quadrature receive local oscillator signals $LO(I)_{RX}$ and $LO(Q)_{RX}$ to mixers 164A and 164B. Local oscillator signals $LO(I)_{RX}$ and $LO(Q)_{RX}$ have a frequency corresponding to the carrier frequency of received signals. For example, the frequency of $LO(I)_{RX}$ and $LO(Q)_{RX}$ differs from the carrier frequency of received signals by a carrier frequency offset (CFO) that is a source of signal impairment. In the transmitter AFE 120, switches 123A and 123B are respectively coupled to mixers 124A and 124B and are configured in the normal operating mode to provide in-phase and quadrature transmit local oscillator signals $LO(I)_{TX}$ and $LO(Q)_{TX}$ to mixers 124A and 124B. The frequency of the local oscillator signals $LO(I)_{TX}$ and $LO(Q)_{TX}$ is the carrier frequency of the transmitted signals, and is distinct from the frequency of the local oscillator signals $LO(I)_{RX}$ and $LO(Q)_{RX}$.

Figure 1B:
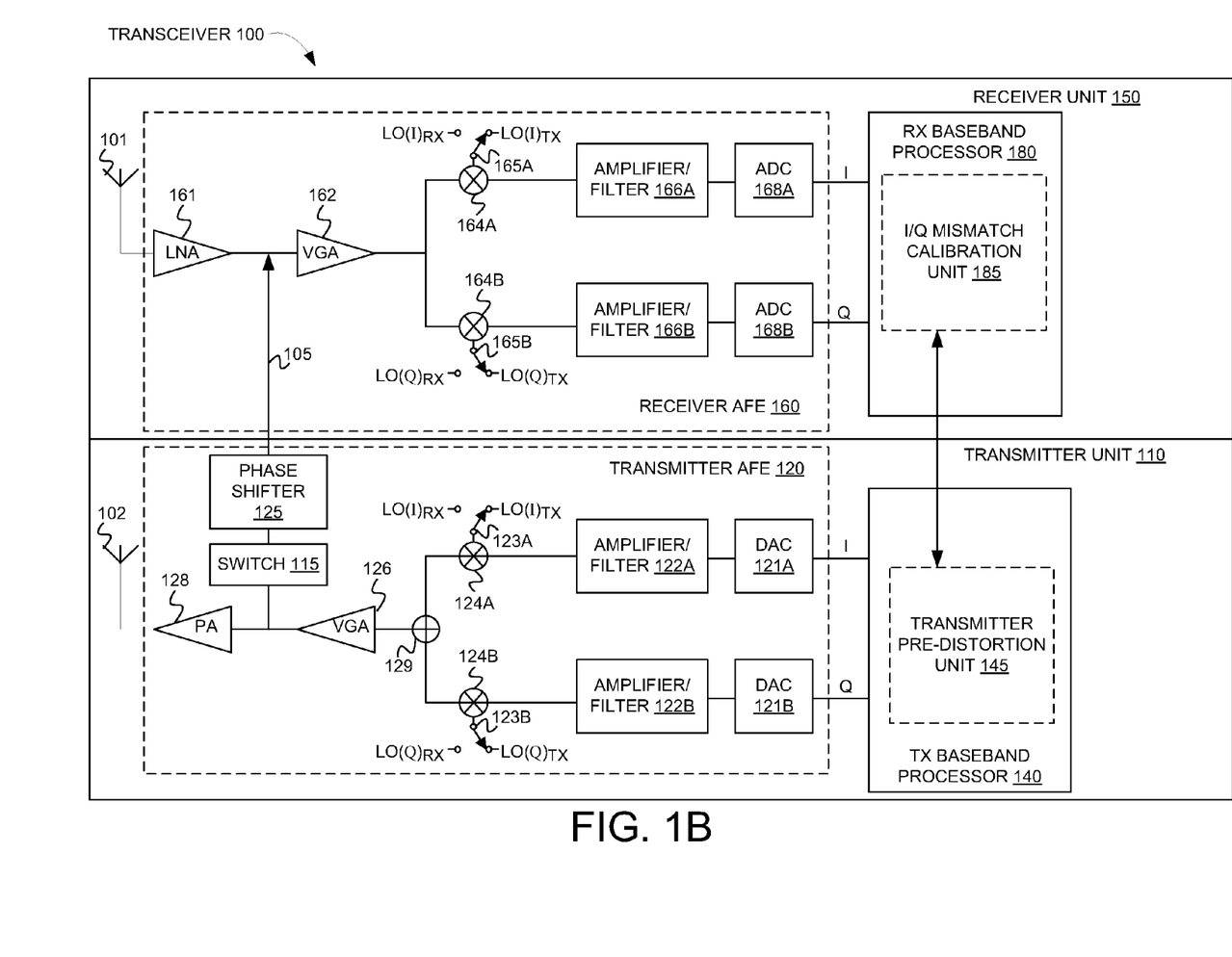
Figure 1C:
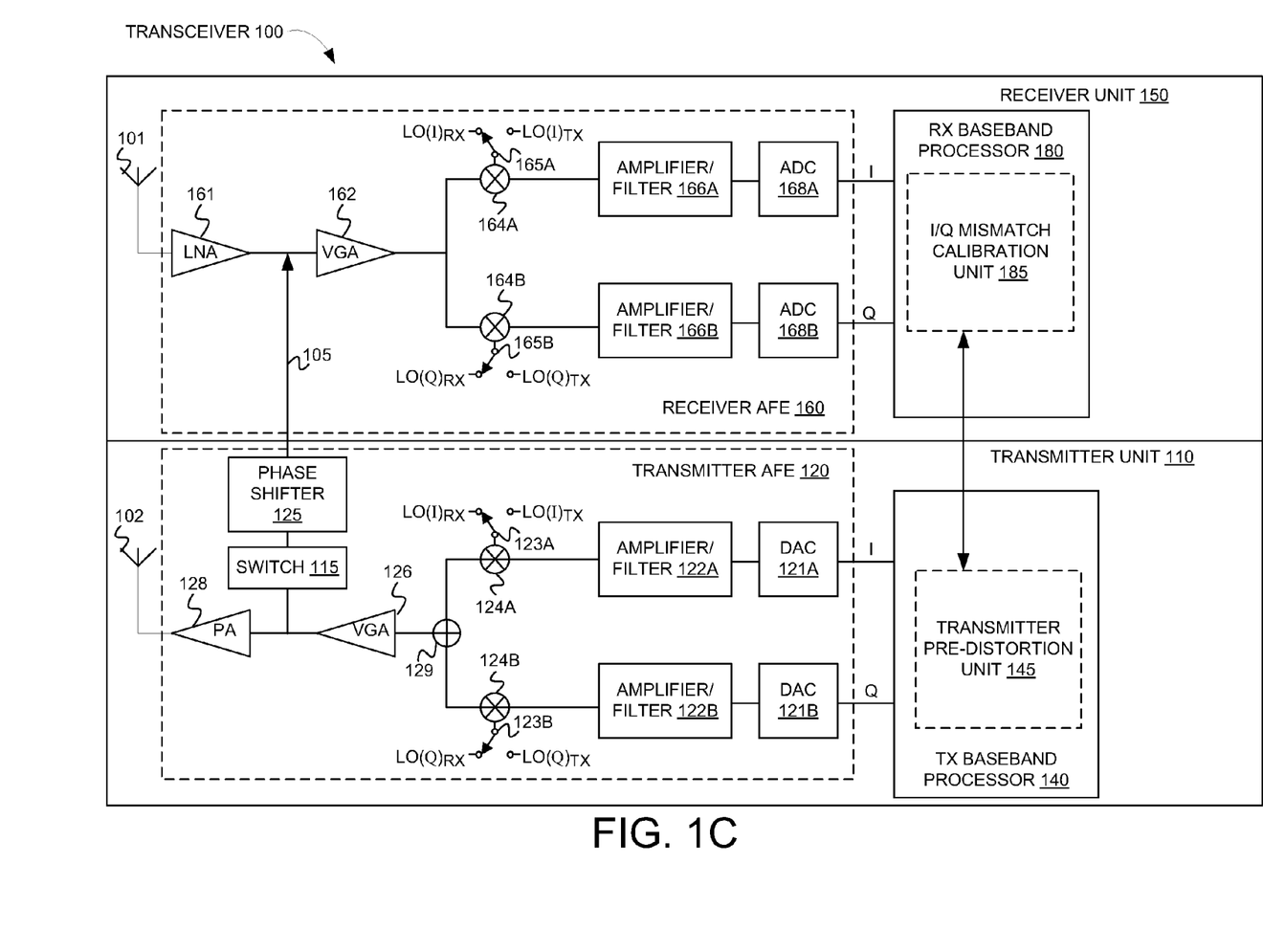

Each of the switches 165A, 165B, 123A, and 123B is configurable to provide either a transmit or a receive local oscillator signal to its corresponding mixer 164A, 164B, 124A, and 124B. For example, in a transmitter calibration mode, switches 165A and 123A are configured to provide $LO(I)_{RX}$ to mixers 164A and 124A, and switches 165B and 123B are configured to provide $LO(Q)_{TX}$ to mixers 164B and 124B, as shown in FIG. 1B. In a receiver calibration mode, switches 165A and 123A are configured to provide $LO(I)_{RX}$ to mixers 164A and 124A, and switches 165B and 123B are configured to provide $LO(Q)_{RX}$ to mixers 164B and 124B, as shown in FIG. 1C. The switches thus allow the transmitter unit 110 and receiver unit 150 to operate at the same frequency during calibration, thereby permitting the transceiver 100 to perform loop-back calibration.

In the examples of FIGS. 1A-1C, in the transmitter unit 110, a first end of the loop-back path 105 is coupled between the VGA 126 and the PA 128 of the transmitter AFE 120, and in the receiver unit 150, a second end of the loop-back path 105 is coupled between the LNA 161 and the VGA 162. In other implementations, however, ends of the loop-back path 105 may be coupled to different parts of the circuitry of the transmitter AFE 120 and the receiver AFE 160. For example, the first end of the loop-back path 105 may be coupled between the combiner 129 and the VGA 126 of the transmitter AFE 120, and the second end of the loop-back path 105 may be coupled between the VGA 162 and the LO mixers 164 of the receiver AFE 160. As shown, the loop-back path 105 includes a loop-back switch 115 and a phase shifter 125, which may be part of or separate from the transmitter unit 110 or the receiver unit 150 portions of the transceiver 100. The loop-back switch 115 (e.g., a transistor) is used to open the loop-back path 105 during a normal mode of operation of the transceiver 100 (e.g., when transmitting and receiving RF signals via a network), and close the loop-back path 105 during calibration modes of operation. When closed, the loop-back path couples outputs of mixers 124A and 124B in the transmitter AFE 120 to inputs of mixer 164A and 164B in the receiver AFE 160. In one example, the state of the loop-back switch 115 may be controlled by the I/Q mismatch calibration unit 185 of the receiver baseband processor 180. In other examples, the loop-back switch 115 can be controlled by other device components (e.g., the processor unit 601, FIG. 6, or another controller implemented in hardware and/or software). The phase shifter 125 is used during the calibration modes to add a phase shift to selected signals provided from the transmitter unit 110 to the receiver unit 150, as described further below. In one example, the phase shifter 125 includes a phase shift element (e.g., phase shift element 210, FIG. 2) and a switch (e.g., switch 205, FIG. 2) that is used to bypass the phase shift element.

During a calibration mode of operation, the loop-back switch 115 is closed, and the transmitter unit 110 successively provides a first signal and a second signal to the receiver unit 150 via the loop-back path 105. In some embodiments, the transmitter unit 110 provides the first signal to the receiver unit 150 without intentionally adding a phase shift, and intentionally adds a phase shift to the second signal provided to the receiver unit 150. For example, the switch 205 (FIG. 2) of the phase shifter 125 is closed to bypass the phase shift element 210 during transmission of the first signal. After transmission of the first signal, the switch 205 of the phase shifter 125 is opened, and the transmitter unit 110 provides a second signal to the receiver unit 150 with a phase shift added by the phase shift element 210. In some embodiments, the switch 205 of the phase shifter 125 may be opened and closed by the transmitter pre-distortion unit 145, the I/Q mismatch calibration unit 185, or another control entity of the transceiver 100.

During an I/Q mismatch calibration operation (e.g., transmitter calibration or receiver calibration), the receiver unit 150 determines a first set of I/Q measurements from the first signal and a second set of I/Q measurements from the second signal. For example, the receiver unit 150 determines measurements for both the I and Q components of the first signal, and measurements for both the I and Q components of the second signal with an added phase shift. The receiver unit 150 then calculates transmitter I/Q mismatch parameters and receiver I/Q mismatch parameters based on the first and second sets of I/Q measurements. For example, the receiver unit 150 calculates the transmitter gain mismatch, receiver gain mismatch, transmitter phase mismatch, and receiver phase mismatch. Depending on the calibration mode, the receiver unit 150 provides the transmitter unit 110 with the transmitter I/Q mismatch parameters. During transmitter calibration, for example, the I/Q mismatch calibration unit 185 provides the transmitter pre-distortion unit 145 with the calculated transmitter gain mismatch and transmitter phase mismatch, which are used to perform pre-distortion operations during normal operations, as further described below.

The components described with reference to FIGS. 1A-1C are exemplary only. In various embodiments, one or more of the components described may be omitted, combined, or modified, and additional components may be included. For instance, in some embodiments, the transmitter unit 110 and receiver unit 150 may share a common antenna, or may have various additional antennas and transmitter/receiver chains. In some implementations, the transceiver 100 may include less or more filter and/or amplifier circuitry (e.g., blocks 122A-B and 166A-B of FIGS. 1A-1C). In some implementations, the phase shift that is added to the second signal can be added by other techniques (e.g., by adding an offset to the phase of the local oscillator (LO) signals provided to the mixers 124A-B), as will be described further below.

Figure 2:
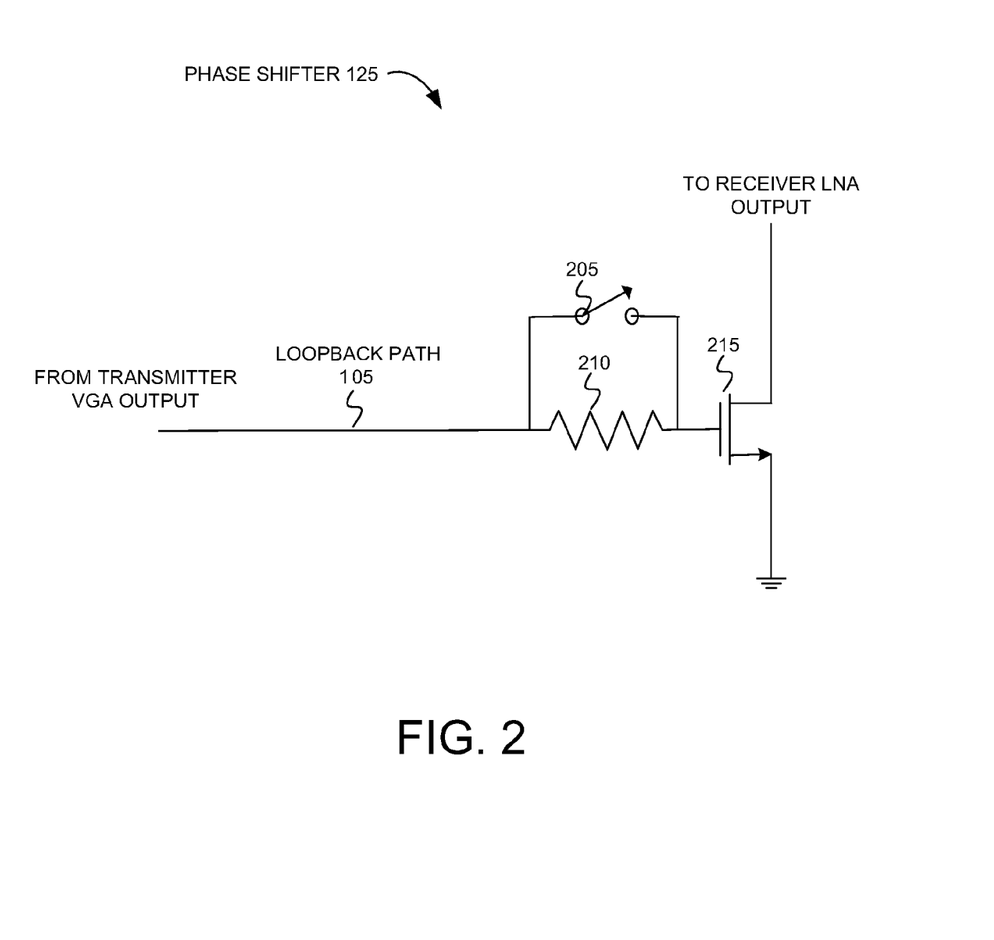
FIG. 2 is a circuit diagram of a phase shift unit in accordance with some embodiments.

FIG. 2 is a circuit diagram of an example of the phase shifter 125. In some embodiments, the phase shifter 125 is included in the transmitter unit 110 within the loop-back path 105 connecting the transmitter unit 110 to the receiver unit 150 (see FIG. 1). As shown in the example of FIG. 2, the phase shifter 125 includes a bypass switch 205, a resistor 210, and a transistor 215. The resistor 210 is a phase shift element that phase-shifts the signal being looped back from the transmitter unit 110 to the receiver unit 150, but may be bypassed by closing the bypass switch 205 to avoid phase-shifting the loop-back signal. In one example, the transistor 215 can be an NMOS transistor. In various implementations, the phase shifter 125 can be enabled by a controlling entity (e.g., the transmitter pre-distortion unit 145 or the I/Q mismatch calibration unit 185, FIGS. 1A-1C) during I/Q mismatch calibration in order to add a phase shift to selected signals provided from the transmitter unit 110 to the receiver unit 150 via the loop-back path 105.

In various implementations, I/Q mismatch calibration is performed at the transceiver 100 to improve (i.e., reduce) the error vector magnitude (EVM) associated with the transmitter unit 110 and/or the EVM associated with the receiver unit 150. The EVM is a measure of the performance of the transmitter unit 110 or the receiver unit 150. For example, a high amount of gain imbalance and/or phase error at the output of the transmitter unit 110 can result in a high EVM for the transmitter unit. I/Q phase mismatch causes the I signal to leak to the Q signal, and vice versa, which leads to crosstalk between the subcarriers, and therefore errors. I/Q mismatch calibration may improve EVM by reducing the transmitter and receiver gain mismatch and phase mismatch that contribute to the EVM. For example, the phase mismatch EVM for the transmitter unit 110 or the receiver unit 150 can be represented by the following equation (Eq. 1):

$$EVM_{I/Q}(\text{dB}) = 10\log_{10}\left(\frac{\varepsilon^2}{4} + \frac{\Delta\theta^2}{4}\right) \quad \text{(Eq. 1)}$$

$\varepsilon$: gain mismatch normalized to nominal gain ($\Delta$gain/gain);
$\theta$: phase mismatch in radians.

As shown in the above equation (Eq. 1), a desired EVM may be achieved by reducing the gain mismatch and/or the phase mismatch. The I/Q mismatch calibration techniques described herein determine (e.g., estimate) and reduce the transmitter gain and phase mismatch and the receiver gain and phase mismatch.

Figure 3:
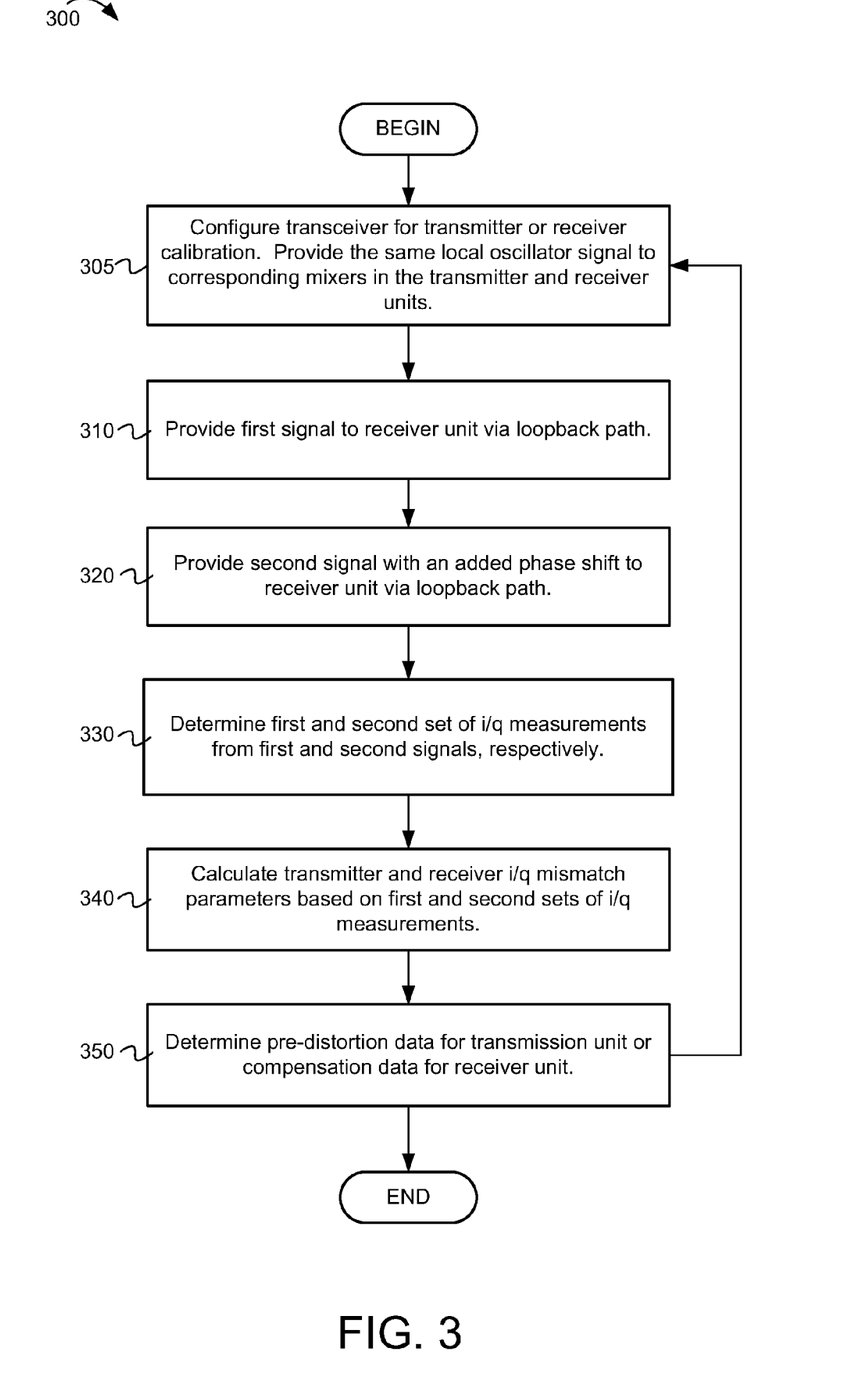
FIG. 3 is a flow diagram of a method for performing I/Q mismatch calibration in an FDD transceiver in accordance with some embodiments.

FIG. 3 is a flow diagram of a method 300 for performing I/Q mismatch calibration in an FDD transceiver 100 (FIGS. 1A-1C) in accordance with some embodiments. At 305, the transceiver 100 is configured for either transmitter calibration or receiver calibration. The same local oscillator signal is provided to corresponding mixers in the transmitter and receiver units 110 and 150. In transmitter calibration mode, switches 165A and 123A are configured to provide $LO(I)_{TX}$ to mixers 164A and 124A, and switches 165B and 123B are configured to provide $LO(Q)_{TX}$ to mixers 164B and 124B, as shown in FIG. 1B. In receiver calibration mode, switches 165A and 123A are configured to provide $LO(I)_{RX}$ to mixers 164A and 124A, and switches 165B and 123B are configured to provide $LO(Q)_{RX}$ to mixers 164B and 124B, as shown in FIG. 1C. These switch configurations allow the transmitter and receiver units 110 and 150 to operate at the same frequency during calibration and thus allow loop-back calibration to be performed.

At 310, the loop-back switch 115 is closed and a first signal is provided from the transmitter unit 110 to the receiver unit 150 via the loop-back path 105. In some embodiments, for transmission of the first signal, bypass switch 205 in the phase shifter 125 (FIG. 2) is closed to bypass the phase shift element 210 and thus avoid intentionally introducing a phase shift to the first signal.

At 320, a second signal is provided from the transmitter unit 110 to the receiver unit 150 via the loop-back path 105. The phase shifter 125 adds a phase shift to the second signal.

For example, the bypass switch 205 in the phase shifter 125 is opened so that the phase shift element 210 is not bypassed; the phase shift element 210 thus adds the phase shift to the second signal. The phase shift added by the phase shifter 125 can be a known phase shift or an unknown phase shift.

At 330, during a transmitter or receiver calibration operation, a first set of I/Q measurements is determined from the first signal received at the receiver unit 150, and a second set of I/Q measurements is determined from the second signal received at the receiver unit 150. In some embodiments, the receiver unit 150 (e.g., I/Q mismatch calibration unit 185) determines measurements for both the I and Q components of the first signal, and measurements for both the I and Q components of the second signal with the added phase shift. The measurements of the receiver I and Q components of the first signal can be represented by the following equations (Eq. 2 and Eq. 3).

$$R_{I1} = G \left\{ \begin{array}{l} \left[ I\left(1 + \frac{\varepsilon_T + \varepsilon_R}{2}\right) + Q\left(\frac{\Delta\theta_R + \Delta\theta_T}{2}\right) \right]\cos\varphi + \\ \left[ Q\left(1 - \frac{\varepsilon_T - \varepsilon_R}{2}\right) + I\left(\frac{\Delta\theta_T - \Delta\theta_R}{2}\right) \right]\sin\varphi \end{array} \right\} \quad \text{(Eq. 2)}$$

$$R_{Q1} = G \left\{ \begin{array}{l} \left[ Q\left(1 - \frac{\varepsilon_T + \varepsilon_R}{2}\right) + I\left(\frac{\Delta\theta_R + \Delta\theta_T}{2}\right) \right]\cos\varphi - \\ \left[ I\left(1 + \frac{\varepsilon_T - \varepsilon_R}{2}\right) + Q\left(\frac{\Delta\theta_T - \Delta\theta_R}{2}\right) \right]\sin\varphi \end{array} \right\} \quad \text{(Eq. 3)}$$

$R_{I1}$, $R_{Q1}$: receiver (RX) I and Q components associated with the first signal, respectively;
I, Q: transmitter (TX) I and Q components associated with the first signal, respectively;
$\varepsilon_T$, $\varepsilon_R$: Gain mismatch normalized to nominal gain for TX and RX, respectively;
$\Delta\theta_T$, $\Delta\theta_R$: Phase mismatch in radians for TX and RX, respectively;
$\varphi$: Effective phase between TX and RX LO signals;
G: Gain from TX baseband to RX baseband through loop-back path.

The measurements of the receiver I and Q components of the second signal (with phase shift $\varphi_{shift}$) can be represented by the following equations (Eq. 4 and Eq. 5).

$$R_{I2} = G \left\{ \begin{array}{l} \left[ I\left(1 + \frac{\varepsilon_T + \varepsilon_R}{2}\right) + Q\left(\frac{\Delta\theta_R + \Delta\theta_T}{2}\right) \right]\cos(\varphi + \varphi_{shift}) + \\ \left[ Q\left(1 - \frac{\varepsilon_T - \varepsilon_R}{2}\right) + I\left(\frac{\Delta\theta_T - \Delta\theta_R}{2}\right) \right]\sin(\varphi + \varphi_{shift}) \end{array} \right\} \quad \text{(Eq. 4)}$$

$$R_{Q2} = G \left\{ \begin{array}{l} \left[ Q\left(1 - \frac{\varepsilon_T + \varepsilon_R}{2}\right) + I\left(\frac{\Delta\theta_R + \Delta\theta_T}{2}\right) \right]\cos(\varphi + \varphi_{shift}) - \\ \left[ I\left(1 + \frac{\varepsilon_T - \varepsilon_R}{2}\right) + Q\left(\frac{\Delta\theta_T - \Delta\theta_R}{2}\right) \right]\sin(\varphi + \varphi_{shift}) \end{array} \right\} \quad \text{(Eq. 5)}$$

$R_{I2}$, $R_{Q2}$: RX I and Q components associated with the second signal, respectively;
I, Q: TX I and Q components associated with the second signal, respectively;
$\varepsilon_T$, $\varepsilon_R$: Gain mismatch normalized to nominal gain for TX and RX, respectively;
$\Delta\theta_T$, $\Delta\theta_R$: Phase mismatch in radians for TX and RX, respectively;
$\varphi + \varphi_{shift}$: Effective phase between TX and RX LO signals with added phase shift;
G: Gain from TX baseband to RX baseband through loop-back path.

As shown above, the equations have six unknowns: $\varepsilon_T$, $\varepsilon_R$, $\theta_T$, $\theta_R$, $\varphi$, G. In some implementations, $\varphi_{shift}$ shift may also be unknown. The I/Q mismatch contributions from the transmitter unit 110 and the receiver unit 150 are combined together in the equations. If $\varphi$ and G (and $\varphi_{shift}$) are not considered for the moment, since they can be obtained using the techniques described below, the equations have four unknowns: the transmitter gain mismatch $\varepsilon_T$, the receiver gain mismatch $\varepsilon_R$, the transmitter phase mismatch $\theta_T$, and the receiver phase mismatch $\theta_R$. The first set of I/Q measurements, represented by the two equations Eq. 2 and Eq. 3, are obtained from the first signal sent from the transmitter unit 110 to the receiver unit 150 via the loop-back path 105. To solve for the four unknown I/Q mismatch parameters, an additional independent measurement (e.g., the second set of I/Q measurements, represented by the two equations Eq. 4 and Eq. 5) is obtained from the second signal with the phase shift $\varphi_{shift}$, for a total of four equations.

At 340, transmitter I/Q mismatch parameters and/or receiver I/Q mismatch parameters are calculated based on the first and second sets of I/Q measurements. For instance, in various implementations, the receiver unit 150 calculates the transmitter I/Q mismatch parameters: transmitter gain mismatch $\varepsilon_T$ and the transmitter phase mismatch $\theta_T$, and the receiver I/Q mismatch parameters: receiver gain mismatch $\varepsilon_R$ and receiver phase mismatch $\theta_m$ based on the equations Eq. 2, Eq. 3, Eq. 4, and Eq. 5 shown above. For example, the I/Q mismatch calibration unit 185 of the receiver unit 150 can solve for $\varepsilon_T$, $\varepsilon_R$, $\theta_T$, $\theta_R$ using the equations Eq. 2-Eq. 5.

In some embodiments, the I/Q mismatch calibration unit 185 calculates the total magnitude and the difference in the magnitude of the I and Q components associated with both the first signal and the second signal received at the receiver unit 150 for cross-correlation purposes, as shown in the following equations (Eq. 6, Eq. 7, Eq. 8, and Eq. 9).

$$\frac{\overline{R_{I1}^2(t)} - \overline{R_{Q1}^2(t)}}{\overline{R_{I1}^2(t)} + \overline{R_{Q1}^2(t)}} = \varepsilon_T \cos 2\varphi + \varepsilon_R + \theta_T \sin 2\varphi \quad \text{(Eq. 6)}$$

$$\frac{2\overline{R_{I1}(t)R_{Q1}(t)}}{\overline{R_{I1}^2(t)} + \overline{R_{Q1}^2(t)}} = -\varepsilon_T \sin 2\varphi + \theta_T \cos 2\varphi + \theta_R \quad \text{(Eq. 7)}$$

$$\frac{\overline{R_{I2}^2(t)} - \overline{R_{Q2}^2(t)}}{\overline{R_{I2}^2(t)} + \overline{R_{Q2}^2(t)}} = \varepsilon_T \cos 2(\varphi + \varphi_{shift}) + \varepsilon_R + \theta_T \sin 2(\varphi + \varphi_{shift}) \quad \text{(Eq. 8)}$$

$$\frac{2\overline{R_{I2}(t)R_{Q2}(t)}}{\overline{R_{I2}^2(t)} + \overline{R_{Q2}^2(t)}} = -\varepsilon_T \sin 2(\varphi + \varphi_{shift}) + \theta_T \cos 2(\varphi + \varphi_{shift}) + \theta_R \quad \text{(Eq. 9)}$$

After calculating the total magnitude and difference in magnitude of the measurements, the gain (G) (i.e., the gain from TX baseband to RX baseband through the loop-back path) shown in the equations Eq. 2-Eq. 5 is divided away, and, after simplification, the four equations shown above (Eq. 6-Eq. 9) are derived. Furthermore, by introducing a fixed I/Q mismatch parameter (e.g., $\Delta\theta_T$) to the TX baseband and re-measuring $R_{I1}$, $R_{Q1}$, $R_{I2}$, and $R_{Q2}$, the cos $2\varphi$, sin $2\varphi$, cos $2(\varphi+\varphi_{shift})$, and sin $2(\varphi+\varphi_{shift})$ values can be independently derived from the above equations (Eq. 6-Eq. 9). In one example, the I/Q mismatch calibration unit 185 introduces the fixed I/Q mismatch parameter (e.g., $\Delta\theta_T$) to the TX baseband via the transmitter pre-distortion unit 145. After determining the cos $2\varphi$, sin $2\varphi$, cos $2(\varphi+\varphi_{shift})$, and sin $2(\varphi+\varphi_{shift})$ values, the result of these measurements is four linear equations with four unknown I/Q mismatch parameters (i.e., the transmitter gain mismatch $\epsilon_T$, the receiver gain mismatch $\epsilon_R$, the transmitter phase mismatch $\theta_T$, and the receiver phase mismatch $\theta_R$). The I/Q mismatch calibration unit 185 then solves for the four unknown I/Q mismatch parameters (e.g., using matrices based on the four linear equations).

In some embodiments, if the transceiver is in transmitter calibration mode, the receiver mismatch parameters calculated at 340 are discarded, and only the transmitter mismatch parameters are used at 350 (below). Likewise, if the transceiver is in receiver calibration mode, the transmitter mismatch parameters calculated at 340 are discarded, and only the receiver mismatch parameters are used at 350 (below).

After solving for the four unknown I/Q mismatch parameters, signal pre-distortion data is determined for the transmission unit 110 or signal compensation data is determined for the receiver unit 150, at 350. If transmitter calibration mode was selected at 305, signal pre-distortion data is determined for the transmission unit 110: it is determined how much to pre-distort signals to be processed and transmitted by the transmitter unit 110 based on the derived transmitter gain mismatch $\epsilon_T$ and the transmitter phase mismatch $\theta_T$ parameters to compensate for the I/Q mismatch at the transmitter unit 110. If receiver calibration mode was selected at 305, signal compensation data is determined for the receiver unit 150: it is determined how much to compensate the signals to be received and processed at the receiver unit 150 based on the derived receiver gain mismatch $\epsilon_R$ and the receiver phase mismatch $\theta_R$ to account for the I/Q mismatch at the receiver unit 150.

For example, in transmitter calibration mode the I/Q mismatch calibration unit 185 of the receiver unit 150 provides the derived transmitter gain mismatch $\epsilon_T$ and the transmitter phase mismatch $\theta_T$ parameters to the transmitter pre-distortion unit 145 of the transmitter unit 110. The transmitter pre-distortion unit 145 may determine how to pre-distort signals to be transmitted by the transmitter unit 110 based on the derived transmitter I/Q mismatch parameters and the desired EVM. For example, if a desired EVM (e.g., an EVM of −36 dB) is specified, the pre-distortion unit 145 may determine how much to pre-distort a signal with respect to gain and phase, based on the derived transmitter gain mismatch $\epsilon_T$ and the transmitter phase mismatch $\theta_T$ parameters (and Eq. 1), to achieve the desired EVM (or achieve a lower EVM). In other implementations, the I/Q mismatch calibration unit 185 may determine how much to pre-distort signals in the transmitter unit 110 and may program the transmitter pre-distortion unit 145 accordingly to achieve the desired EVM. Similarly, in receiver calibration mode the I/Q mismatch calibration unit 185 can determine how much to compensate signals received at the receiver unit 150 based on a desired EVM and on the derived receiver gain mismatch $\epsilon_R$ and the receiver phase mismatch $\theta_R$.

After the method 300 is performed for one mode (e.g., transmitter calibration mode or receiver calibration mode), the method 300 is performed again for another mode (e.g., receiver calibration mode or transmitter calibration mode). In some embodiments, I/Q mismatch calibration operations in accordance with the method 300 are performed periodically, randomly, during pre-programmed time periods, and/or during idle time periods when the transceiver 100 is not processing RF traffic. Furthermore, the method 300 can be repeated one or more times during a particular calibration mode until the desired calibration results have been achieved (e.g., until the desired EVM has been met).

The I/Q mismatch parameters (e.g., the transmitter gain mismatch $\epsilon_T$, the receiver gain mismatch $\epsilon_R$, the transmitter phase mismatch $\theta_T$, and the receiver phase mismatch $\theta_R$) can be derived by various techniques using measurements obtained from the first signal and the second signal having an added phase shift. For instance, in another implementation, the TX baseband processor 140 can apply DC values for the TX I and Q components of the signals that are transmitted to the receiver unit 150 via the loop-back path 105. In one example, using the equations Eq. 2-Eq. 5, for a first set of I/Q measurements $R_{I1}$, $R_{Q1}$ associated with a first signal, the TX I component is set equal to a DC value of A and the TX Q component is set equal to 0. In this example, for a second set of I/Q measurements $R_{I2}$, $R_{Q2}$ associated with a second signal, the TX I component is set equal to 0 and the TX Q component is set equal to a DC value of A. Additionally, in this example, for a third set of I/Q measurements $R_{I3}$, $R_{Q3}$ associated with a third signal, the TX I component is set equal to a DC value of A, the TX Q component is set equal to 0, and $\phi$ is set equal to $\phi+\phi_{shift}$. Furthermore, in this example, for a fourth set of measurements $R_{I4}$, $R_{Q4}$ associated with a fourth signal, the TX I component is set equal to 0, the TX Q component is set equal to a DC value of A, and $\phi$ is set equal to $\phi+\phi_{shift}$. As a result of these measurements, the following four equations (Eq. 10-Eq. 13) can be derived. Similar to the techniques described above, these equations can be used to obtain the transmitter gain mismatch $\epsilon_T$, the receiver gain mismatch $\epsilon_R$, the transmitter phase mismatch $\theta_T$, and the receiver phase mismatch $\theta_R$, as long as $\phi$ and $\phi+\phi_{shift}$ are not equal to (or relatively close to) values that cause inaccuracies due to the tangent function in Eq. 10-Eq. 13 approaching infinity (e.g., when either $\phi$ or $\phi+\phi_{shift}$ is equal to (or approximately equal to) 90 degrees). It is noted that Eq. 6-Eq. 9 do not have this phase value restriction since Eq. 6-Eq. 9 do not include the tangent function.

$$\varepsilon_T + \varepsilon_R + (\Delta\theta_T - \Delta\theta_R)\tan\varphi = \frac{R_{I1}}{R_{Q2}} - 1 \quad \text{(Eq. 10)}$$

$$\varepsilon_T - \varepsilon_R - \frac{(\Delta\theta_T + \Delta\theta_R)}{\tan\varphi} = \frac{R_{I2}}{R_{Q1}} + 1 \quad \text{(Eq. 11)}$$

$$\varepsilon_T + \varepsilon_R - (\Delta\theta_T - \Delta\theta_R)\tan(\varphi + \varphi_{shift}) = \frac{R_{I3}}{R_{Q4}} - 1 \quad \text{(Eq. 12)}$$

$$\varepsilon_T - \varepsilon_R - \frac{(\Delta\theta_T + \Delta\theta_R)}{\tan(\varphi + \varphi_{shift})} = \frac{R_{I4}}{R_{Q3}} - 1 \quad \text{(Eq. 13)}$$

Figure 4:
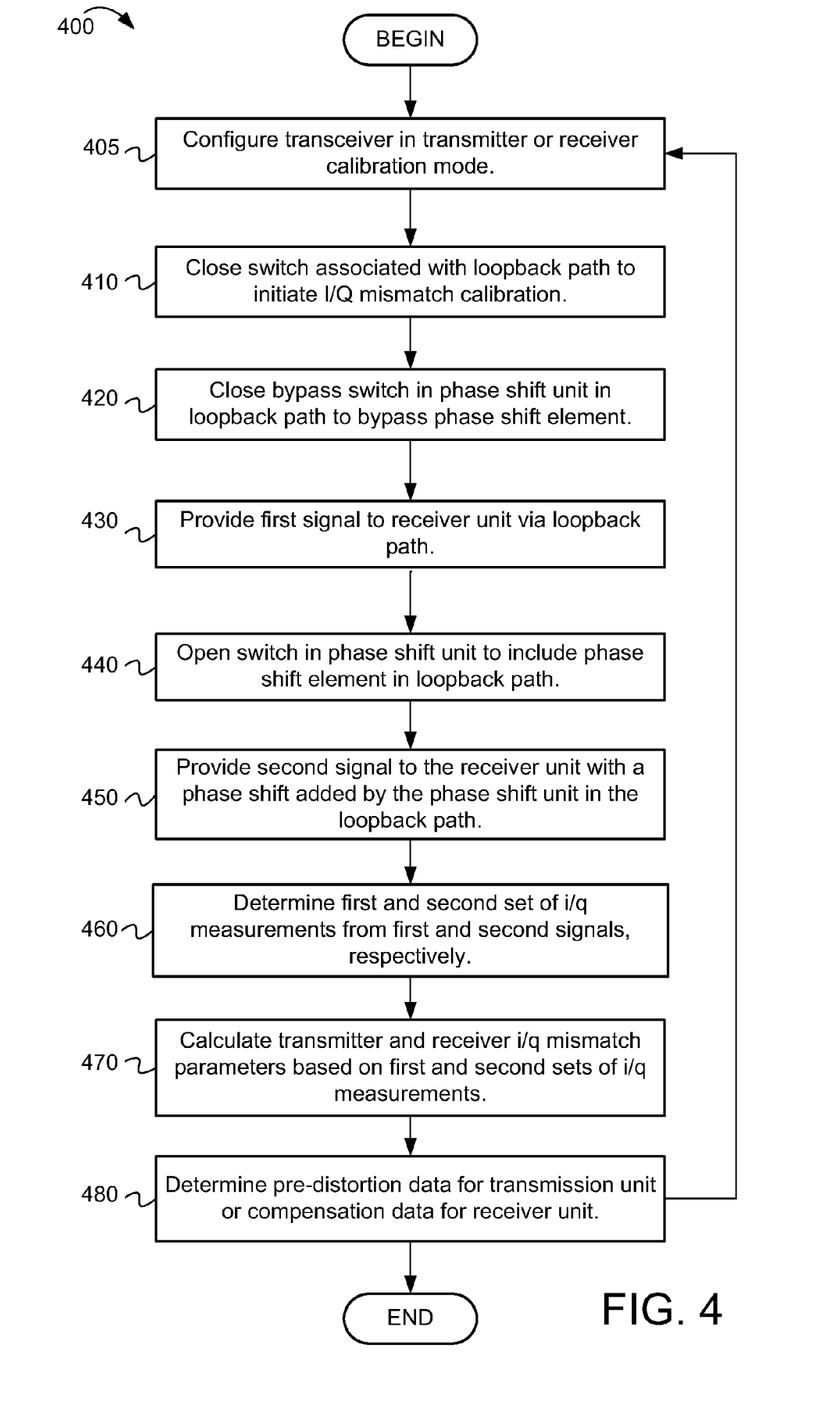
FIG. 4 is a flow diagram of a method for performing I/Q mismatch calibration in an FDD transceiver in accordance with some embodiments.

FIG. 4 is a flow diagram of another method 400 for performing I/Q mismatch calibration in an FDD transceiver 100 in accordance with some embodiments. At 405, the transceiver 100 is configured in either transmitter calibration mode or receiver calibration mode. In transmitter calibration mode, switches 165A and 123A are configured to provide $LO(I)_{TX}$ to mixers 164A and 124A, and switches 165B and 123B are configured to provide $LO(Q)_{TX}$ to mixers 164B and 124B, as shown in FIG. 1B. In receiver calibration mode, switches 165A and 123A are configured to provide $LO(I)_{RX}$ to mixers 164A and 124A, and switches 165B and 123B are configured to provide $LO(Q)_{RX}$ to mixers 164B and 124B, as shown in FIG. 1C. These switch configurations ensure that the transmitter and receiver units operate at the same frequency during calibration and thus allow loop-back calibration to be performed.

At 410, the loop-back path switch 115 in the loop-back path 105 is closed. At 420, the bypass switch 205 (FIG. 2) of the phase shifter 125 is closed to bypass the phase shift element 210 in the loop-back path 105. At 430, a first signal is provided from the transmitter unit 110 to the receiver unit 150 via the loop-back path 105. Since the bypass switch 205 is closed, the first signal bypasses the phase shift element 210 (FIG. 2); the first signal therefore is not intentionally phase-shifted. At 440, the bypass switch 205 of the phase shifter 125 is opened to include the phase shift element 210 in the loop-back path 105. At 450, a second signal is provided from the transmitter unit 110 to the receiver unit 150 via the loop-back path. Since the bypass switch 205 is open, the phase shifter 125 adds a phase shift to the second signal. In one implementation, the phase shifter 125 can be designed such that the pole associated with the resistor 210 and the gate capacitor of the transistor 215 is at a predetermined frequency to obtain a desired phase shift. For example, if the pole associated with the resistor 310 and the gate capacitor of the transistor 215 is at approximately the RF carrier frequency, a phase shift of approximately 45 degrees may be added to the second signal. However, the phase shifter 125 may have any suitable design to add a phase shift to selected signals during I/Q mismatch calibration.

At 460, first and second sets of I/Q measurements are determined from the first and second signals, respectively. At 470, transmitter and receiver I/Q mismatch parameters are calculated based on the first and second sets of I/Q measurements. At 480, pre-distortion data is determined for transmission unit 110 if the transceiver is in transmitter calibration mode, and compensation data is determined for the receiver unit 150 if the receiver is in receiver calibration mode. In blocks 460-480, the first and second signals may be processed using similar techniques as described above with reference to method 300 (FIG. 3). In some embodiments, transmitter I/Q mismatch parameters determined in receiver calibration mode are discarded and thus not used to determine transmitter pre-distortion data. Likewise, receiver I/Q mismatch parameters determined in transmitter calibration mode are discarded and not used to determine receiver compensation data in accordance with some embodiments.

After the method 400 is performed for one mode (e.g., transmitter calibration mode or receiver calibration mode), the method 400 is performed again for another mode (e.g., receiver calibration mode or transmitter calibration mode). In some embodiments, I/Q mismatch calibration operations in accordance with the method 400 are performed periodically, randomly, during pre-programmed time periods, and/or during idle time periods when the transceiver 100 is not processing RF traffic. Furthermore, the method 400 can be repeated one or more times during a particular calibration mode until the desired calibration results have been achieved (e.g., until the desired EVM has been met).

A phase shift may be added to the second signal by various other techniques than that described for the phase shifter 125 (FIG. 2). In some embodiments, the phase of the local oscillator (LO) signals provided to mixers 124A and 124B in the transmitter AFE 120 (FIGS. 1A-1C) is offset prior to being provided to the mixers 124A and 124B. By changing the phase of the transmitter LO signals (either $LO(I/Q)_{TX}$ or $LO(I/Q)_{RX}$, depending on, the mode) when the transmitter unit 110 is processing the second signal, a phase shift is added to the second signal. In one example, a voltage-controlled oscillator (VCO) may generate the transmitter LO signal (or a multiple of the LO signal) that is provided to the mixers 124A and 124B. In this example, when the transmitter unit 110 is processing the second signal, the phase of the output of the VCO may be offset prior to being provided to the mixers 124A and 124B to add a phase shift to the second signal.

After the I/Q mismatch calibration operations have been completed, the I/Q mismatch calibration unit 185 (or another controlling entity) opens the loop-back path switch 115 to open the loop-back path 105 between the transmitter unit 110 and the receiver unit 150. The transceiver 100 then enters a normal mode of operation, with the switches 123A, 123B, 165A, and 165B configured as shown in FIG. 1A. During the normal operational mode, the pre-distortion unit 145 of the transmitter unit 110 pre-distorts the signals being processed by the transmitter unit 110 based on the transmitter I/Q mismatch parameters calculated during the transmitter calibration mode to compensate for I/Q mismatch at the transmitter unit 110. Furthermore, during the normal operational mode, the I/Q mismatch calibration unit 185 of the receiver unit 150 processes signals received by the receiver unit 150 based on the receiver I/Q mismatch parameters calculated during the receiver calibration mode to compensate for I/Q mismatch at the receiver unit 150. In some implementations the pre-distortion unit 145 of the transmitter unit 110 and the I/Q mismatch calibration unit 185 of the receiver unit 150 simultaneously compensate for the I/Q mismatch at the transmitter unit 110 and the receiver unit 150, respectively.

Figure 5:
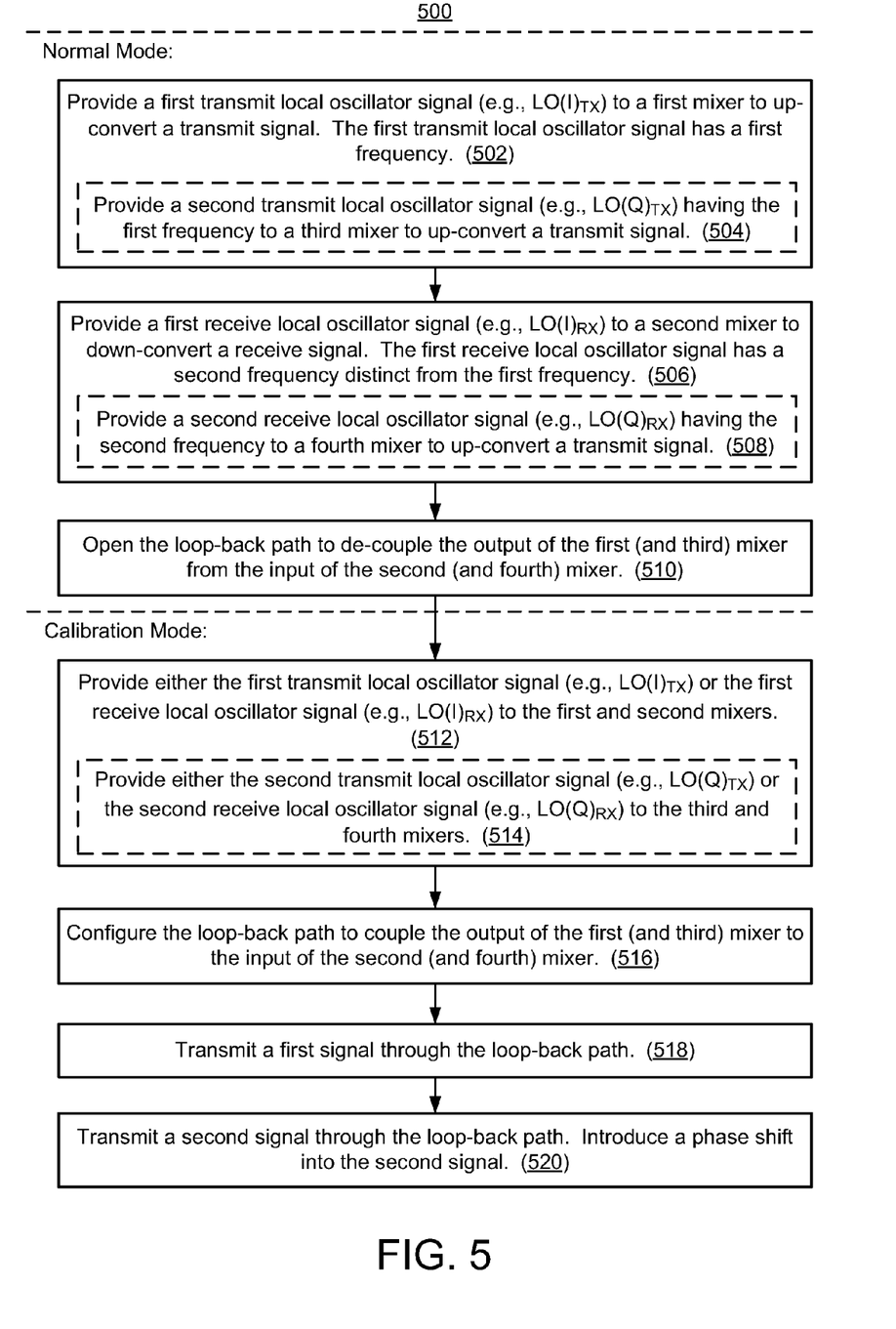
FIG. 5 is a flow diagram illustrating a method of operating an FDD transceiver in accordance with some embodiments.

FIG. 5 is a flow diagram illustrating a method 500 of operating an FDD transceiver (e.g., the transceiver 100, FIGS. 1A-1C) in accordance with some embodiments.

In a normal mode of operation, at 502, a first transmit local oscillator signal (e.g., in-phase transmit local oscillator signal $LO(I)_{TX}$, FIGS. 1A-1C) is provided to a first mixer (e.g., mixer 123A, FIGS. 1A-1C) to up-convert a transmit signal (e.g., an in-phase transmit signal). The first transmit local oscillator signal has a first frequency. In some embodiments, a second transmit local oscillator signal (e.g., quadrature transmit local oscillator signal $LO(Q)_{TX}$, FIGS. 1A-1C) is provided to a third mixer (e.g., mixer 123B, FIGS. 1A-1C) to up-convert a transmit signal (e.g., a quadrature transmit signal), at 504. The second transmit local oscillator signal has the first frequency.

A first receive local oscillator signal (e.g., in-phase receive local oscillator signal $LO(I)_{RX}$, FIGS. 1A-1C) is provided to a second mixer (e.g., mixer 165A, FIGS. 1A-1C) to down-convert a receive signal, at 506. The first receive local oscillator signal has a second frequency that is distinct from the first frequency. In some embodiments, a second receive local oscillator signal (e.g., quadrature receive local oscillator signal $LO(Q)_{RX}$, FIGS. 1A-1C) is provided to a fourth mixer (e.g., mixer 165B, FIGS. 1A-1C) to down-convert the receive signal, at 508. The second receive local oscillator signal has the second frequency.

An example of the operations 502, 504, 506, and 508 is shown in FIG. 1A.

At 510, a loop-back path (e.g., loop-back path 105, FIGS. 1A-1C) is opened to de-couple the output of the first (and in some embodiments, the third) mixer from the input of the second (and in some embodiments, the fourth) mixer. For example, the switch 115 (FIGS. 1A-1C) is opened during the normal mode.

In a calibration mode, either the first transmit local oscillator signal (e.g., in-phase transmit local oscillator signal $LO(I)_{TX}$) or the first receive local oscillator signal (e.g., in-phase receive local oscillator signal $LO(I)_{RX}$) is provided to the first and second mixers, at 512. In some embodiments, either the second transmit local oscillator signal (e.g., quadrature transmit local oscillator signal $LO(Q)_{TX}$) or the second receive local oscillator signal (e.g., quadrature receive local oscillator signal $LO(Q)_{RX}$) is provided to the third and fourth mixers, at 514.

In some embodiments, the calibration mode is a transmitter calibration mode. The first transmit local oscillator signal (e.g., in-phase transmit local oscillator signal $LO(I)_{TX}$) is provided to the first and second mixers, at 512. In some embodiments, the second transmit local oscillator signal (e.g., quadrature transmit local oscillator signal $LO(Q)_{TX}$) is provided to the third and fourth mixers, at 514. An example of the transmitter calibration mode is shown in FIG. 1B.

In some embodiments, the calibration mode is a receiver calibration mode. The first receive local oscillator signal (e.g., in-phase receive local oscillator signal $LO(I)_{RX}$) is provided to the first and second mixers, at 512. In some embodiments, the second receive local oscillator signal (e.g., quadrature receive local oscillator signal $LO(Q)_{RX}$) is provided to the third and fourth mixers, at 514. An example of the receiver calibration mode is shown in FIG. 1C.

At 516, the loop-back path (e.g., loop-back path 105, FIGS. 1A-1C) is configured in the calibration mode to couple the output of the first (and in some embodiments, the third) mixer to the input of the second (and in some embodiments, the fourth) mixer. For example, the switch 115 (FIGS. 1A-1C) is closed during the calibration mode. At 518, a first signal is transmitted through the loop-back path (e.g., as described for operations 310, FIG. 3, and 430, FIG. 4). At 520, a second signal is transmitted through the loop-back path, with a phase shift being introduced in the process (e.g., as described for operations 320, FIG. 3, and 450, FIG. 4). For example, the phase shift element 210 is switched out of the loop-back path 105 by closing the switch 205 (FIG. 2), and the first signal is transmitted through the loop-back path 105, at 518. The phase shift element 210 is then switched into the loop-back path 105 by opening the switch 205 (FIG. 2), and the second signal is transmitted through the loop-back path 105, at 520.

In some embodiments, the method 500 may include operating an FDD transceiver (e.g., the transceiver 100, FIGS. 1A-1C) in each of the transmitter calibration mode and the receiver calibration mode, with the operations 512, 514, 516, 518, and 520 being repeated for each of these two modes.

The method 500 thus generates signals that may be used to calibrate for I/Q mismatch in an FDD transceiver. Calibration using the signals generated in the method 500 may be performed as described for the method 300 (FIG. 3) and/or 400 (FIG. 4).

While the methods 300 (FIG. 3), 400 (FIG. 4), and 500 (FIG. 5) include a number of operations that appear to occur in a specific order, it should be apparent that the methods 300, 400, and/or 500 can include more or fewer operations, which can be executed serially or in parallel. For example, the operations 502, 504, 506, 508, and/or 510 may be performed in parallel, and the operations 512, 514, and/or 516 may be performed in parallel. An order of two or more operations may be changed and two or more operations may be combined into a single operation. For example, the portion of the method 500 in the calibration mode may be performed before the portion of the method 500 in the normal mode.

Figure 6:
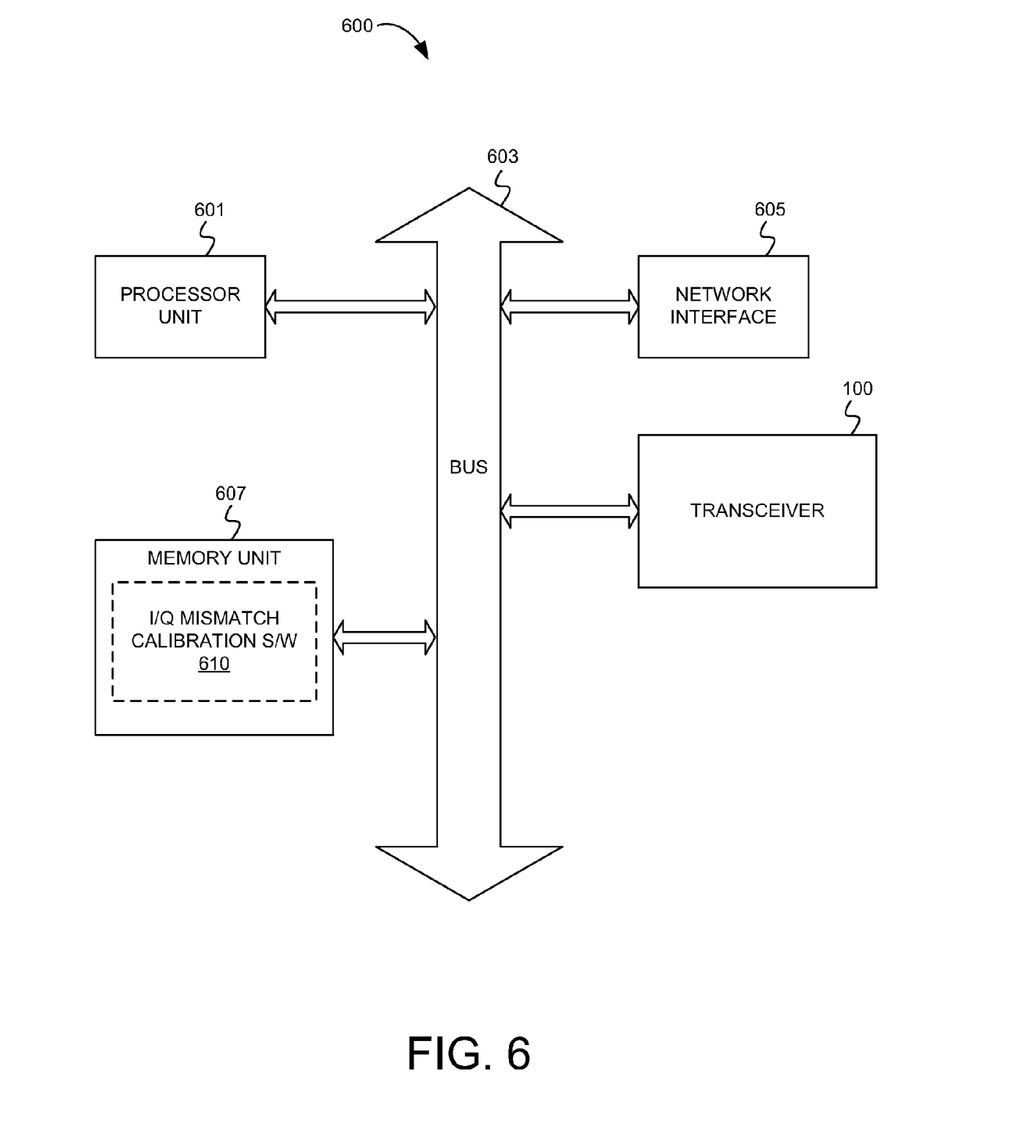
FIG. 6 is a block diagram of a communication device in accordance with some embodiments.

FIG. 6 is an example of a block diagram of a communication device 600 that includes one or more implementations of a transceiver 100 (FIGS. 1A-1C). In some embodiments, the device 600 is a wireless device (e.g., a WLAN device, such as a personal computer, laptop or tablet computer, mobile phone, personal digital assistant, GPS device, wireless access point, or other device). In some embodiments, the device 600 has a wired network connection.

The device 600 includes a processor unit 601, memory unit 607, network interface 605, and transceiver 100 (FIGS. 1A-1C) coupled by a bus 603. The processor unit 601 includes one or more processors and/or processor cores. In some embodiments, the network interface 605 includes at least one wireless network interface (e.g., a WLAN interface, a Bluetooth® interface, a WiMAX interface, a ZigBee® interface, a Wireless USB interface, etc.). In some embodiments, the device 600 includes at least one wired network interface (e.g., to interface with a coaxial cable or other physical medium).

The memory unit 607 includes a non-transitory computer-readable storage medium (e.g., one or more nonvolatile memory elements, such as EPROM, EEPROM, Flash memory, a hard disk drive, and so on) that stores an I/Q mismatch calibration software module 610. In some embodiments, the software module 610 includes instructions that, when executed by the processor unit 601, the receiver baseband processor 180 (FIGS. 1A-1C), and/or the transmitter baseband processor 140 (FIGS. 1A-1C), cause the mobile device 600 to perform the methods 300, 400, and/or 500 (FIGS. 3-5).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A frequency-division duplexing transceiver, comprising:
   a first mixer to up-convert a transmit signal;
   a first switch, coupled to the first mixer, to selectively provide a transmit local oscillator signal or a receive local oscillator signal to the first mixer, wherein the transmit local oscillator signal has a first frequency and the receive local oscillator signal has a second frequency distinct from the first frequency, and wherein the first switch is to provide the transmit local oscillator signal to the first mixer during a normal mode and a transmitter calibration mode;
   a second mixer to down-convert a receive signal; and
   a second switch, coupled to the second mixer, to selectively provide the transmit local oscillator signal or the receive local oscillator signal to the second mixer, wherein the second switch is to provide the transmit local oscillator signal to the second mixer during the transmitter calibration mode.

2. The transceiver of claim 1, further comprising a loop-back path to selectively couple an output of the first mixer to an input of the second mixer.

3. The transceiver of claim 2, wherein the loop-back path comprises a phase shifter.

4. The transceiver of claim 3, wherein the phase shifter comprises a phase shift element and a switch to selectively bypass the phase shift element.

5. The transceiver of claim 3, wherein the loop-back path further comprises a switch, in series with the phase shifter, to selectively open or close the loop-back path.

6. The transceiver of claim 1, wherein:
   the first switch is to provide the receive local oscillator signal to the first mixer during a receiver calibration mode; and
   the second switch is to provide the receive local oscillator signal to the second mixer during the normal mode and the receiver calibration mode.

7. The transceiver of claim 1, wherein the transmit signal is an in-phase transmit signal, the transmit local oscillator signal is an in-phase transmit local oscillator signal, and the receive local oscillator signal is an in-phase receive local oscillator signal, the transceiver further comprising:
   a third mixer to up-convert a quadrature transmit signal;
   a third switch, coupled to the third mixer, to selectively provide a quadrature transmit local oscillator signal or a quadrature receive local oscillator signal to the third mixer, wherein the quadrature transmit local oscillator signal has the first frequency and the quadrature receive local oscillator signal has the second frequency;
a fourth mixer to down-convert the receive signal; and
a fourth switch, coupled to the fourth mixer, to selectively provide the quadrature transmit local oscillator signal or the quadrature receive local oscillator signal to the second mixer.

8. The transceiver of claim 7, wherein:
the third switch is to provide the quadrature transmit local oscillator signal to the third mixer during the normal mode and the transmitter calibration mode; and
the fourth switch is to provide the quadrature transmit local oscillator signal to the fourth mixer during the transmitter calibration mode.

9. The transceiver of claim 8, wherein:
the first switch is to provide the in-phase receive local oscillator signal to the first mixer during a receiver calibration mode;
the third switch is to provide the quadrature receive local oscillator signal to the third mixer during the receiver calibration mode;
the second switch is to provide the in-phase receive local oscillator signal to the second mixer during the normal mode and the receiver calibration mode; and
the fourth switch is to provide the quadrature receive local oscillator signal to the fourth mixer during the normal mode and the receiver calibration mode.

10. The transceiver of claim 7, further comprising:
a combiner to combine the up-converted in-phase and quadrature transmit signals; and
a loop-back path to selectively couple an output of the combiner to an input of the second and fourth mixers.

11. The transceiver of claim 10, further comprising:
a first amplifier coupled between the combiner and the loop-back path; and
a second amplifier coupled between the loop-back path and the input of the second and fourth mixers.

12. A method of operating a frequency-division duplexing transceiver, comprising:
in a normal mode:
providing a transmit local oscillator signal to a first mixer to up-convert a transmit signal, wherein the transmit local oscillator signal has a first frequency, and
providing a receive local oscillator signal to a second mixer to downconvert a receive signal, wherein the receive local oscillator signal has a second frequency distinct from the first frequency; and
in a transmitter calibration mode, providing transmit local oscillator signal to the first and second mixers.

13. The method of claim 12, further comprising, in the transmitter calibration mode, configuring a loop-back path to couple an output of the first mixer to an input of the second mixer.

14. The method of claim 13, further comprising, in the transmitter calibration mode:
transmitting a signal through the loop-back path; and
phase-shifting the signal in the loop-back path.

15. The method of claim 13, further comprising, in the transmitter calibration mode:
switching a phase-shift element out of the loop-back path;
with the phase-shift element switched out of the loop-back path, transmitting a first signal through the loop-back path;
switching the phase-shift element into the loop-back path; and
with the phase-shift element switched into the loop-back path, transmitting a second signal through the loop-back path.

16. The method of claim 13, further comprising, in the normal mode, opening the loop-back path to de-couple the output of the first mixer from the input of the second mixer.

17. The method of claim 12, further comprising
providing the receive local oscillator signal to the first and second mixers in a receiver calibration mode.

18. The method of claim 12, wherein the transmit signal is an in-phase transmit signal, the transmit local oscillator signal is an in-phase transmit local oscillator signal, and the receive local oscillator signal is an in-phase receive local oscillator signal, the method further comprising:
in the normal mode:
providing a quadrature transmit local oscillator signal to a third mixer to up-convert a quadrature transmit signal, and
providing a quadrature receive local oscillator signal to a fourth mixer to down-convert the receive signal, wherein the quadrature transmit local oscillator signal has the first frequency and the quadrature receive local oscillator signal has the second frequency; and
in the transmitter calibration mode, providing the quadrature transmit local oscillator signal to the third and fourth mixers.

19. The method of claim 18, further comprising, in a receiver calibration mode:
providing the in-phase receive local oscillator signal to the first and second mixers; and
providing the quadrature receive local oscillator signal to the third and fourth mixers.

20. The method of claim 18, further comprising, in the transmitter calibration mode:
combining outputs of the first and third mixers to generate a first signal and a second signal;
configuring a loop-back path to provide the first and second signals to inputs of the second and fourth mixers;
switching a phase-shifter out of the loop-back path;
with the phase-shifter switched out of the loop-back path, transmitting the first signal through the loop-back path to the second and fourth mixers;
switching the phase-shifter into the loop-back path; and
with the phase-shifter switched into the loop-back path, transmitting the second signal through the loop-back path to the second and fourth mixers.

21. A non-transitory computer-readable storage medium storing instructions, which when executed by a processor in a communication device comprising a transceiver, cause the transceiver to:
provide a transmit local oscillator signal to a first mixer to up-convert a transmit signal in a normal mode, wherein the transmit local oscillator signal has a first frequency;
provide a receive local oscillator signal to a second mixer to down-convert a receive signal in the normal mode, wherein the receive local oscillator signal has a second frequency distinct from the first frequency; and
provide the transmit local oscillator signal to the first and second mixers in a transmitter calibration mode.

22. A frequency-division duplexing transceiver, comprising:
a first mixer to up-convert a transmit signal;
a second mixer to down-convert a receive signal;
means for selectively providing a transmit local oscillator signal or a receive local oscillator signal to the first mixer, wherein the transmit local oscillator signal has a first frequency and the receive local oscillator signal has a second frequency distinct from the first frequency, and wherein the transmit local oscillator signal is to be provided to the first mixer during a normal mode and a transmitter calibration mode; and means for selectively providing the transmit local oscillator signal or the receive local oscillator signal to the second mixer, wherein the transmit local oscillator signal is to be provided to the second mixer during the transmitter calibration mode.

23. The non-transitory computer-readable storage medium of claim 21, wherein the instructions, when executed by the processor, further cause the transceiver to provide the receive local oscillator signal to the first and second mixers in a receiver calibration mode.

* * * * *